Aug. 15, 1967 G. NEIDL 3,336,220
METHOD OF AND APPARATUS FOR TREATING SEWAGE CONTAINING
BIOLOGICALLY DECOMPOSABLE ORGANIC MATTER
Filed July 20, 1964 7 Sheets-Sheet 1

INVENTOR.
Georg Neidl
BY
Mestern, Ross & Mestern

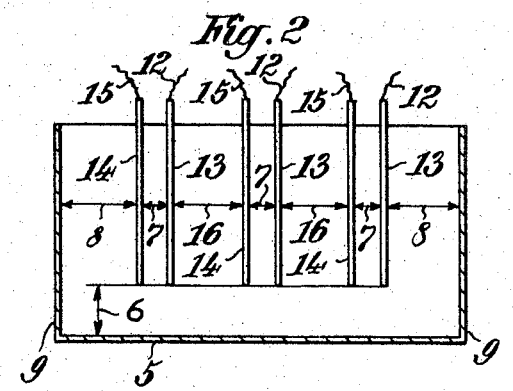
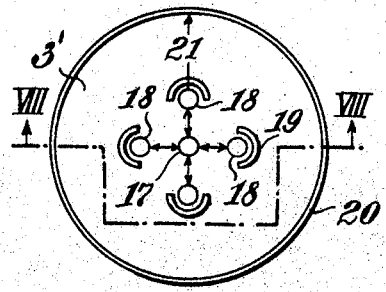
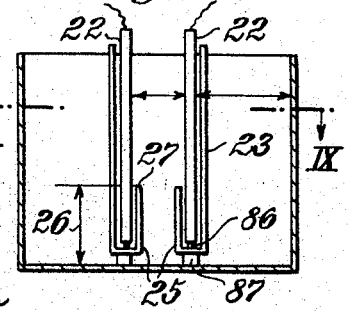
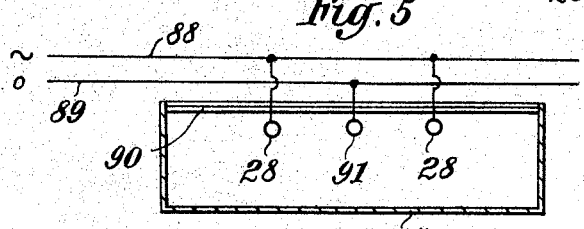
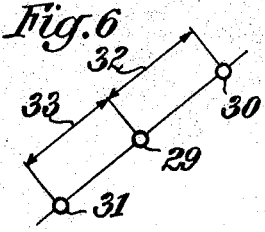
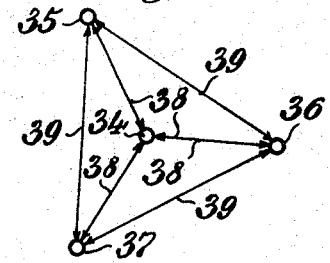

Aug. 15, 1967 G. NEIDL 3,336,220
METHOD OF AND APPARATUS FOR TREATING SEWAGE CONTAINING
BIOLOGICALLY DECOMPOSABLE ORGANIC MATTER
Filed July 20, 1964 7 Sheets-Sheet 3
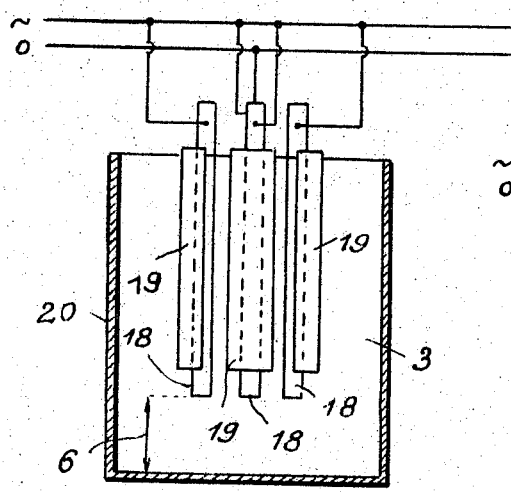
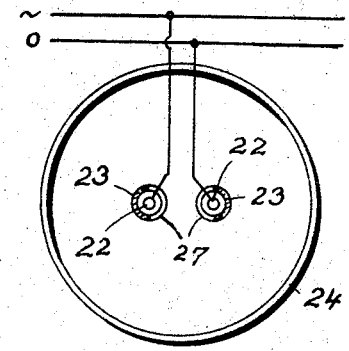
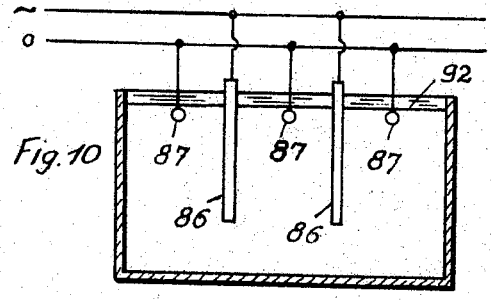
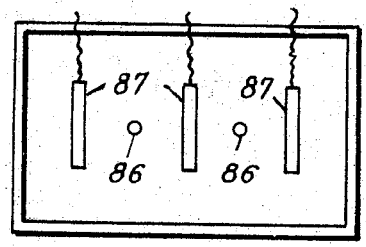
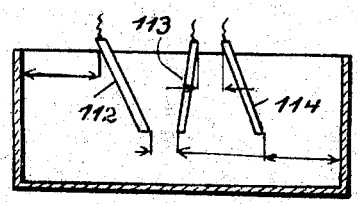
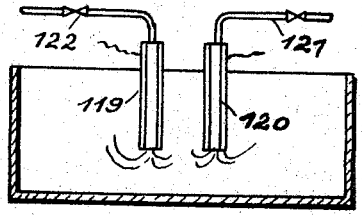
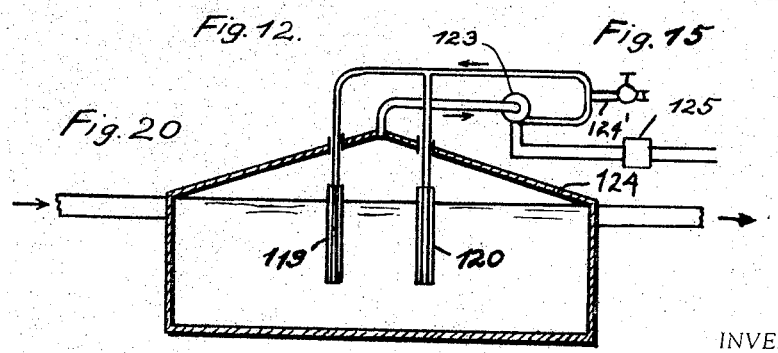
INVENTOR.
Georg Neidl
BY
Mestern, Ross & Mestern

United States Patent Office

3,336,220
Patented Aug. 15, 1967

3,336,220
METHOD OF AND APPARATUS FOR TREATING SEWAGE CONTAINING BIOLOGICALLY DECOMPOSABLE ORGANIC MATTER
Georg Neidl, Im Bisch 664, Schaan, Furstentum, Liechtenstein
Filed July 20, 1964, Ser. No. 383,687
14 Claims. (Cl. 210—14)

My present invention relates to a method of and apparatus for the treatment of water containing biologically decomposable organic matter and, more particularly, to a process and apparatus for accelerating the biological action on such organic matter contained within a body of liquid. The present invention is a continuation-in-part of my copending application Ser. No. 67,806, filed Nov. 6, 1960, and now abandoned.

It has been proposed heretofore to purify industrial wastes and other effluents containing both mineral and organic matter with the aid of electric currents whose principal utility is to electrolyze the liquid and cause sedimentation, agglomeration and/or coagulation of the various substances present in the waste water. For this purpose, a direct current has been principally employed although it is a common practice to superimpose an alternating current upon the direct current, the function of the alternating current being to prevent or reduce fouling of the electrodes. As indicated above, however, these processes have their primary utility in circumstances in which the contaminants in the water are present in an ionic state and migrate to an electrode of opposite electrical charge and deposit at such electrode.

In another system for treating waste waters, an electric current is employed to generate oxygen and, possibly, hydrogen; again the electrolysis takes place with the aid of a direct current. This method of purification is designed to develop oxygen in the body of water as a form of aeration, the oxygen activating aerobic bacteria or other microorganisms to induce them to attack the organic constituents of the waste stream. In this case too, it has been proposed to superimpose an alternating current upon the direct current in an effort to prevent fouling of the electrodes.

It should be further observed that the processing of sewage-containing liquid streams and especially the decontamination treatment of such wastes takes place generally in a succession of stages. Usually, the wastes, containing organic matter decomposable by microorganisms, are passed into sedimentation tanks wherein the velocity of the stream decreases so that large inorganic particles and bodies are deposited or are removed by rakes. From the sedimentation tank or tanks the liquid wastes are passed into settling and/or decomposition tanks in which biological degradation occurs under the influence of inoculation by activated sludge or some other medium containing the microorganisms. When the microorganisms are aerobic, it is desirable to aerate the raw sewage either prior to its passage into the settling tank or while it is in the latter. The decomposition results in a substantially clear effluent which, after removal of the sludge, can be led out to a body of water without materially contaminating it; another product of the purification is this sludge which settles in the decomposition tank or a settling tank connected therewith and has a high biological activity rendering it suitable for use in inoculating the incoming stream of sewage. This sludge can, moreover, be treated in such manner as to convert it into a fertilizer or can be discarded, as the situation requires. It is in the artificial aeration of sewage wastes that the electrolysis method of producing oxygen in such waste has found application.

It is the principal object of the present invention to provide an improved method of and apparatus for the treatment of sewage containing biodegradable organic matter.

As more generally described in the above-identified copending application, it has been found that, surprisingly, unique results in the biodegradation of organic wastes can be obtained when such wastes are subjected to alternating currents of moderate frequencies in such manner that electrolysis does not occur. It has long been the belief of workers in the field of biodegradation that techniques involving the use of electric currents in media containing microorganisms adapted to attack the organic matter is not to be countenanced and that electrical-aeration techniques, for example, while adding oxygen to the water, will also shock the microorganisms and inhibit the decomposition reaction. I have now found, surprisingly, that this feared reaction does not occur and that when an *alternating* electric current at a relatively low current density within a specific range is passed through the sewage, an increase in the activity of the microorganisms occurs. It cannot be over-emphasized that the shock reaction suspected by those skilled in the art does indeed occur at higher current densities while at relatively low current densities no significant acceleration of the activity of the microorganisms is noted.

It is also significant that electrical treatment of sewage on a large scale, even to accomplish the electrolytic aeration mentioned above, has not been practical because of the danger of shock to the operators of the sewage treatment plant and the considerable power losses which would be involved. Theoretically, the settling tanks (e.g. of lined or unlined concrete), can be electrically insulated from ground; this, however, has the marked disadvantage that the cost of constructing such tanks is excessive. These tanks are usually quite deep so that not only the floor but also the walls of the tank would have to be electrically insulated from ground. Even if the tank is to be fully insulated from ground, complete electrical insulation would not be possible because of the continuous influx of sewage into the tank and its efflux therefrom; grounding of the tank would thus occur along the streams of water. The use of devices to interrupt the water streams and permit electric current to pass only during such interruptions has been found to be impractical from an economic point of view. It has been found that these disadvantages can be avoided when the electric current used for the purpose indicated above, i.e. to activate the microorganisms, passes between at least one pair of electrodes spacedly immersed in the sewage to be treated, one electrode being connected with the ground side of an alternating-current source while the other electrode is connected to the power side thereof. The electrodes are so spaced and arranged in the tank that the distance between them is smaller than the closest distance of each electrode from a wall (e.g. the floor or lateral walls) of the tank. Preferably, the distance of the electrodes from one another is a small fraction of the closest distance from either electrode (especially the power electrode when the neutral or indifferent electrode is grounded) from the wall of the tank. The electric-current field is thus concentrated between the two electrodes with only a minor portion of the current flowing between the walls and the power electrode. Since the proportion of the current between the power electrode and the neutral electrode or the walls falls off geometrically with the relative distances, in practice the entire current flow will be between the electrodes.

This arrangement has the advantage that the electrical-treatment method can be used in existing sewage-treatment plants without requiring modification of the vessel itself. Furthermore, there is substantially no detectable voltage above ground aside from that prevalent at the electrodes so that there is no danger of an accident as long as the electrodes and their supply lines are enclosed.

Surprisingly, the effect of the electrical treatment is observable throughout the tank in spite of the fact that the distance between the electrodes is much less than their spacing from the walls of the tank. It is believed that the stimulating action of the electric current induces the microorganisms to move away from the electric field toward the walls of the tank and in effect causes microorganisms outside the field to flow into it much in the manner of a thermal convection current. Thus there is a circulation of the micro-organisms throughout the tank and all of the micro-organisms are eventually subjected to electrical stimulation, such stimulation effecting an acceleration of the metabolic rates of the micro-organisms and thus the rate of decomposition of the organic matter. In part, the increased rate of the decomposition may also be due to the fact that a homogeneous distribution of micro-organisms is found in the tank after initiation of electrical activation. It is another plausible explanation of the acceleration of decomposition that quantities of sewage and sludge which have become activated with the aid of the electric field are thoroughly mixed with the remainder of the sewage as an inoculant therefor.

It is a feature of the present invention that amounts of electrically stimulated activated sludge can be withdrawn from the tank and recycled to an incoming sewage stream or to sewage in another tank the inoculated mass not being subjected to further electrical treatment. It has been found that the activated-sludge inoculant subjected to electrical stimulation retains its increased activity even after the stimulation has been cut off so that its use to inoculate further masses of sewage results in a faster purification thereof than is possible with activated sewage not subjected to electrical stimulation. It is more desirable, however, to subject the inoculated batch to further electrical treatment and thereby increase the decomposition rate additionally. In any case, it must be noted that the alternating current, which is present to the exclusion of any direct or electrolysis current, should have a current density sufficient to activate the living decomposition-promoting organisms but less than that at which the organisms are destroyed or rendered ineffectual by alternating-current fields. Best results are obtained when a current density between substantially 1 and 100 milliamperes/cm.$^2$ is used with a frequency ranging between substantially 40 and 500 cycles/sec. Exceptionally high rates of sewage decomposition are obtained at a current density of 10 milliamperes/cm.$^2$ and at frequencies of about 50–60 cycles/sec.

It is another feature of the present invention to constitute at least one of the electrodes as a mixing or agitating means for increasing the homogenity of the sewage by displacing it within the decomposition tank. In this connection, it should be noted that it is also contemplated that air be admixed with or introduced into the sewage liquid, especially when aerobic microorganisms are present to decompose the organic matter. In this respect, the means for introducing the air or oxygen can be a tubular electrode immersed in the sewage and constituting also the agitating means mentioned above. If the introduction of air is not required, the gas supplied through the electrode can be inert with respect to the biodegradation and merely serve as an agitating agent. In fact, the agitating gas can be a gas evolved from the sewage by decomposition and collected by housing means above the decomposition tank. In most cases, the biological decomposition of sewage and particularly household effluents of urban centers gave rise to methane gas which can be collected and recycled to the sewage as an agitating medium. This gas can also be used as a source of fuel to drive the pumps of the treatment plant or to generate the alternating current used to energize the micro-organisms. When the agitating means is a mechanically displaceable electrode, it is desirable that the latter be formed with veins or the like (e.g. a helicoidal rib) or a movable electrode.

Preferably, a polyphase alternating current serves as the stimulus for the micro-organisms and the number of power electrodes is equal to the number of phases, with the power electrodes being equidistant from one another and with respect to a neutral or indifferent electrode positioned centrally with respect to them. This neutral electrode is advantageously grounded, i.e. at the same potential as the concrete tank. In order to further insure that any electric current flow between the power electrodes and the walls of the tank are minimized, shield means can partially surround the electrodes along those portions juxtaposed with walls of the tank. It is frequently possible, under these circumstances, to arrange the closest distance between the power electrodes and the walls of the tank in such manner that the electrical path through the sewage between the tank wall and the power electrode is of a resistance substantially higher than the resistance through the sewage between the power electrodes and the neutral electrode.

The above and other objects, features and advantages of the present invention will become more readily apparent from the following description and specific example, reference being made to the accompanying drawing in which:

FIG. 2 is a similar cross-sectional view through a treatment tank using a plurality of electrodes;

FIG. 3 is a top plan view of a circular tank with a multiplicity of electrodes;

FIG. 4 is a vertical cross-sectional view of another tank whose electrodes are provided with shields;

FIG. 5 is a vertical cross-sectional view through a sewage-feed conduit according to the invention;

FIGS. 6 and 7 are diagrams of electrode arrangements for respective polyphase systems;

FIG. 8 is a cross-sectional view taken along the line VIII—VIII of FIG. 3;

FIG. 9 is a cross-sectional view taken along the line IX—IX of FIG. 4;

FIG. 10 is a view similar to FIG. 5 of still another sewage conduit;

FIG. 11 is a top plan view of the trough of FIG. 10 with the cover removed;

FIG. 12 is a vertical cross-sectional view through yet another treatment tank according to the invention;

FIG. 15 is a view similar to FIG. 12 of yet another treatment tank;

FIG. 20 is a vertical cross-sectional view of another treatment tank showing the means for collecting the gases evolved during decomposition.

Figure 21:
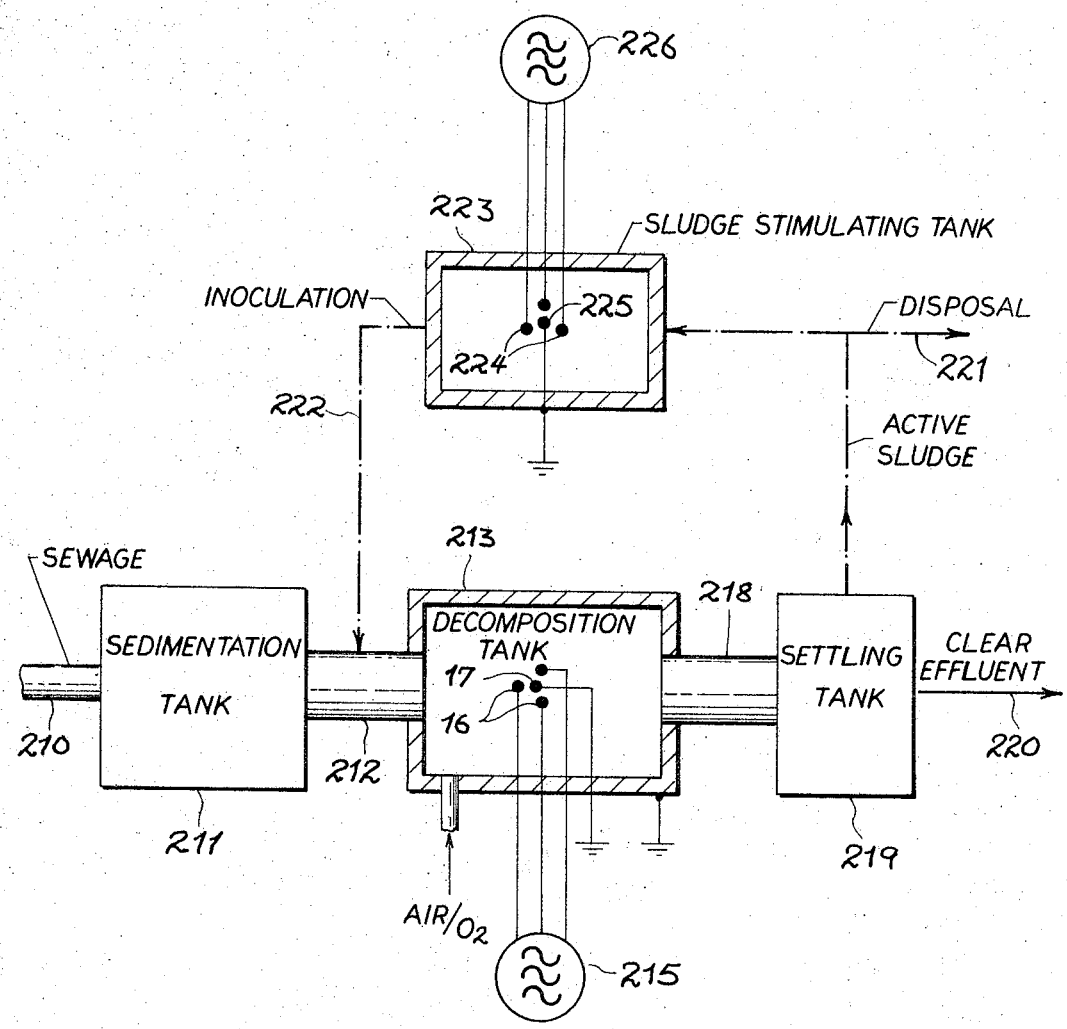
FIG. 21 is a flow diagram of a sewage treatment plant for carrying out the method of the present invention and adapted to use any of the decomposition or stimulating tanks illustrated in FIGS. 1–20.

Prior to discussing the specific embodiments of the invention in detail, it is believed that an overall consideration of a sewage-treatment plant according to the invention would be in order. In FIG. 21, there is shown diagrammatically a sewage-treatment plant in which collected household wastes and urban sewage is led via a conduit 210 into a sedimentation tank 211 in which the flow velocity of the sewage decreases sharply and inorganic solids (e.g. sand, stones and the like) are deposited. This sediment and nondecomposable floating debris are removed by moving rakes or the like in a conventional manner and the organic sewage continues its flow via a spillway of conduit 212 into a decomposition tank. In the decomposition or treatment tank 213, the sewage can be aerated by the introduction of air or oxygen via supply line 214 to promote biological decomposition of the sewage and sludge formation. The air or oxygen stream also serves to agitate the sewage in the absence of mechanical agitation by other means, e.g. movement of the electrodes. In the decomposition tank, the biological degradation process is accelerated by the use of an alternating current applied via a three-phase source 215 to a plurality of angularly spaced electrodes 16 surrounding a neutral or indifferent electrode 17 which is grounded. The tank itself is at ground potential and the distance between each of the powered electrodes 216 and the indifferent electrodes 217 is substantially smaller than the closest distance between any of the electrodes 216 and a wall of the decomposition tank.

From the decomposition tank, the sewage passes via duct 218 into a settling tank 219 from which a clear effluent emerges at 220. The biologically active sludge of the settling tank may be disposed of by any conventional technique (line 221) with a portion of the sludge being recycled to the oncoming raw sewage (line 222) to inoculate the latter and insure the presence of sufficient decay micro-organisms to effect the treatment process. It is also possible, in accordance with the present invention, to eliminate the electrodes 216, 217 and the source 215 at the decomposition tank and yet achieve electrical stimulation of the decomposition reaction. In this case, the active sludge from settling tank 219, which has not been directly stimulated by an alternating current, is passed into a sludge-stimulating tank 223 whose capacity can be much less than that of the decomposition tank 213 as a consequence of the relatively small amount of sludge subjected to treatment. In the sludge-stimulating tank, a plurality of power electrodes 224 are immersed and are equidistant from the neutral or indifferent electrode 225 which is grounded and thus at the same potential as the walls of tank 223. The power electrodes 224 are energized by a three-phase source 226. In this case, only a fraction of the sludge is stimulated electrically and this stimulated portion of the sludge is used to inoculate the raw sewage (line 222).

It is also possible to operate the plant with both of the sources 215 and 226 in use. In this case, an extraordinarily high degree of decomposition is observed in the sludge leaving the decomposition tank. All of the sludge can be subjected to further electrical stimulation in the settling tank 219, in which case electrodes identical to those illustrated at 216 and 217 will be disposed in tank 219 and connected with A-C source 215. Frequently, it is desirable to employ electrical stimulation not for the treatment of raw sewage but exclusively to treat the sludge deposited therefrom. In this case, tank 213 will constitute a settling tank through which the sewage is passed quickly so that substantially undecomposed sludge results, this sludge being subjected to electrical stimulation and inoculation as part of the sludge disposal process. It will be understood that any of the tanks illustrated in FIGS. 1–20 can be substituted for the decomposition or settling tank 213 and the sludge-stimulating tank 223. In cases where the receptacle or tank for the sewage during electrical stimulation is merely a duct with the electrodes disposed therein, such duct can be substituted for either of the ducts 212 or 218.

Figure 1:
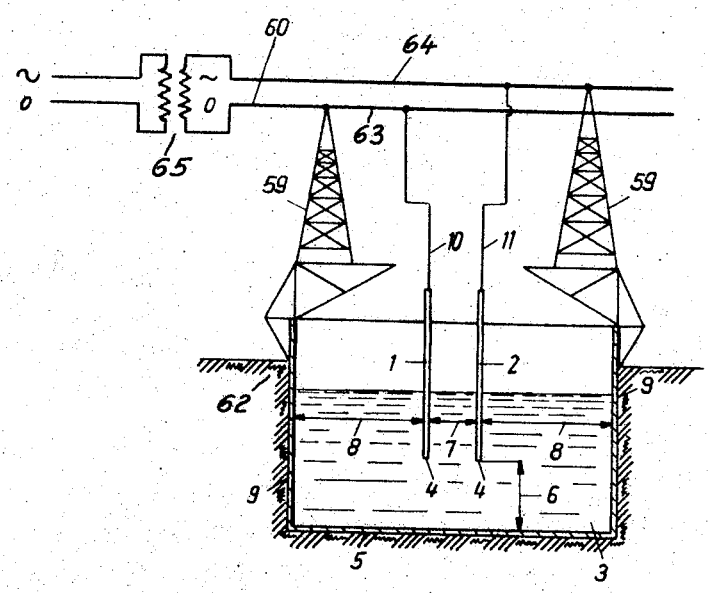
FIG. 1 is a vertical cross-sectional view through a sewage-treatment tank, in accordance with the present invention, diagrammatically illustrating the electrode and tank-wall distances.
Figure 18:
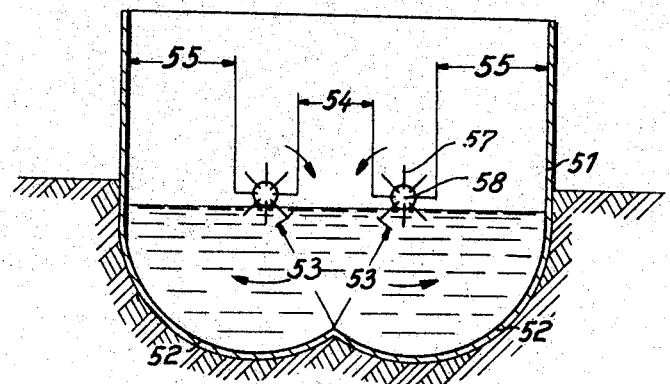
FIG. 18 is a cross-sectional view similar to FIG. 16 showing another embodiment of this invention.
Figure 13:
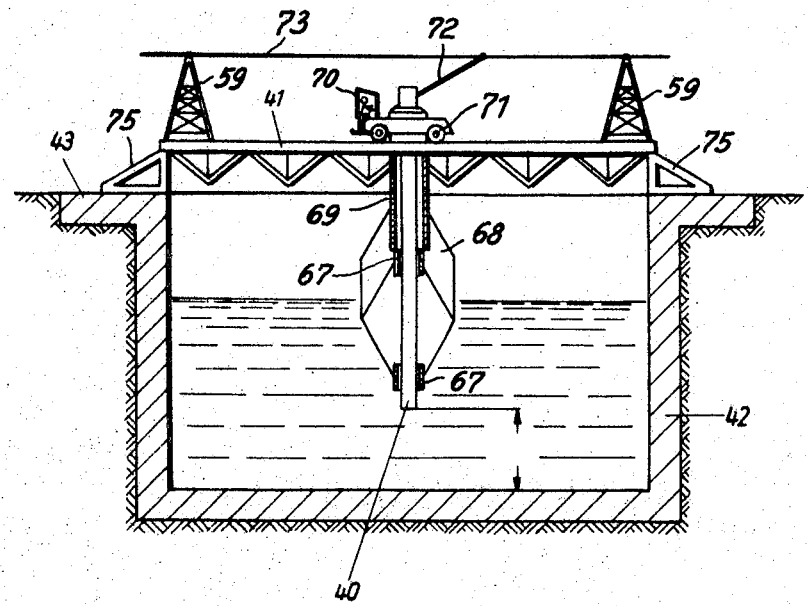
FIG. 13 is a view similar to FIG. 1 of a system wherein the electrodes are displaceable with respect to the liquid in the tank.
Figure 14:
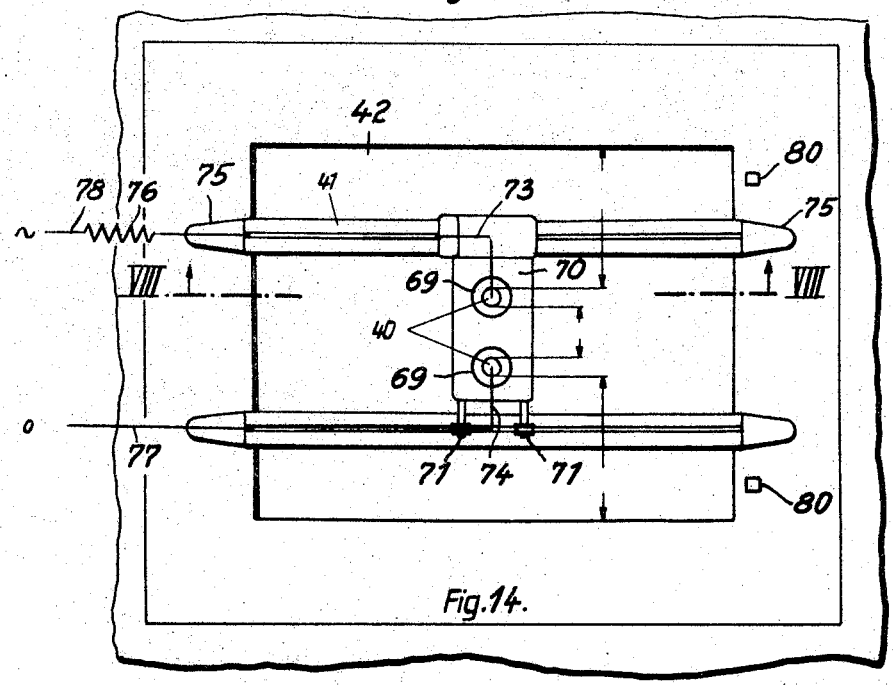
FIG. 14 is a plan view of the apparatus of FIG. 13.

Referring now to specific constructions of treatment tanks in accordance with the present invention, it will be observed that FIG. 1 shows a treatment tank 3 of steel embedded in the ground and receiving a raw sewage. A pair of spaced-apart vertical cylindrical electrodes 1 and 2 depend into the sewage within tank 3 in spaced relationship with the walls and floor of the tank. Thus, the distance 6 of the lower extremities 4 of the electrodes 1, 2 from the floor 5 of tank 3 is greater than the distance 7 between the two electrodes. The closest distance 8 of the two electrodes from the lateral walls 9 of the tank is several times greater than the distance 7 between the electrodes. Electrode 1 is connected by a conductor 10 to the neutral or indifferent bus bar 63 of an alternating-current network 60. The other electrode 2 is connected via a conductor 11 to the power bus bar 64 of this network. A pair of pylons 59 support the bus bars 63 and 64 with respect to the tank and electrically insulate them therefrom. When the alternating current is applied to the two electrodes, the field is concentrated in the gap between them while substantially no current flow occurs between the power electrode 2 and the walls 9 and floor 11 of the tank because the resistance along these paths is much greater than that between the electrodes 1 and 2. The tank 3 need not, as indicated above, be of insulating material and is in intimate contact with the surrounding earth 62 so that it is at substantially ground potential. An alternating current frequency between 40 and 500 cycles/sec. is employed and electrolysis is thus avoided. The electrodes do not become encrusted even in highly contaminated water and sludge; the electrodes can be composed of carbon which is chemically inert with respect to most waste waters. The transformer 65 in the A-C network of this figure can be used to adjust the current density within the desired range (between substantially 1 and 100 milliamperes/cm. and preferably 10 ma./cm.$^2$).

*Example*

An urban sewage consisting primarily of biologically decomposable household wastes along with a minor amount of industrial contaminants is admitted to a sewage treatment tank having a diameter of 8 m. and an effective liquid depth of about 5 m. and sludge permitted to settle with the free-flowing effluent removed. When the tank is filled with the sludge, the two electrodes, which are composed of carbon and have diameters of 6 cm., are energized by 50 cycle alternating current. The electrodes are immersed to a depth of about 1 m. in the sludge and are spaced apart by about 2 m. The applied voltage is 18 volts and a current of 6 amp. (corresponding to 10 ma./cm.$^2$) is applied. A timer is connected in circuit with the A-C source so that the current passes for a period of three minutes, is interrupted for a period of twelve minutes, and again is permitted to flow for three minutes, etc. This sludge treatment occurs with introduction of an active sludge inoculant and mechanical agitation of the sewage. A similar test carried out with essentially indentical sludge, inoculation and agitation showed in a corresponding treatment time (about twelve hours) a significantly smaller amount of methane evolution (approximately one-quarter to three-quarters of that produced with electrical stimulation) and a much higher quantity of undecomposed organic matter.

In FIG. 2, I show an arrangement wherein a three-phase source is employed to energize the electrodes. In this case, three power electrodes 13 are connected to the respective phase leads 12 of a three-phase source and are juxtaposed with respective indifferent electrodes 14 connected via conductors 15 to the common terminal or ground of the three-phase source. In this case, the distance 7 between each pair of electrodes 13, 14 is less than the distance 8 between the outermost electrodes and the wall 9 of the tank and less than the distance between the bottoms of the electrodes and the floor 5. Moreover, the distance 16 between pairs of electrodes should be greater than the distance 7 between the electrodes of each pair. Although in the system of FIG. 2 there is some phase shifting of the alternating-current phases applied to the respective electrodes 12, no electrolysis is found to occur, presumably because of the large distances 16 between individual pairs of electrodes.

In FIGS. 3 and 8, I show an arrangement wherein several power electrodes 18, symmetrically disposed about the central neutral electrode 17, are connected in parallel to the power side of a single phase alternating-current network. In order to increase the effective resistance of the shortest path between the power electrodes 18 and the walls of the tank 3′, semi-cylindrical shields 19 are disposed between the electrodes 18 and the walls in such manner that the shields are concave in the direction of the neutral electrode 17. Even in this case, however, it is preferred that the distance between the electrodes 17 and 18 be less than the distance between the electrodes 18 and the outer wall 20 of that tank. It is conceivable that the insulating screens 19 can so increase the effective resistance of the path 21 as to permit the actual distance between the electrodes 18 and the wall 20 to be less than that between the electrodes 18 and the central electrode 17.

In the modification illustrated in FIGS. 4 and 9, the electrodes are also enclosed at their bottoms by the insulating shield. In this case, the electrodes 22 are partially surrounded by the insulating shield 23 interposed between the electrodes and the wall 24 of the tank. The insulating shields 23 have hooked re-entrant portions 25 which enclose the bottoms of the electrodes so that they are exposed only at a distance 26 above the floor of the tank. The insulating shield 23 can be formed with stands 87 enabling them to be free-standing on the floor of the tank and with pedestals 86 carrying the electrodes 22. In this case the actual distance between the bottoms of the electrodes 22 and the floor of the tank can be less than the distance between the electrodes. The smallest effective part from the electrodes 22 to the floor of the tank is that extending over the uppermost edge 27 of the re-entrant portion of the shield. This distance, equivalent to the distance 26 mentioned earlier, is greater than the spacing between the electrodes. In the case of multiphase systems, it is necessary to shield only the power electrodes since the indifferent or neutral electrodes are almost invariably at ground potential, i.e. the potential of the tank walls. In all cases in which polyphase systems are illustrated, therefore, the neutral electrode can be electrically connected to the tank, e.g. by being physically mounted thereon without benefit of insulators or the like.

In the system of FIG. 5 I illustrate diagrammatically how the present invention can be employed with ducts conveying the sewage or sludge from one treatment area to another. In the previously described embodiments, the electrodes have been disposed in tanks where the sludge mass is not through-flowing. In the system of FIG. 5, the duct 3″ can also be a horizontally elongated tank if desired. A plurality of horizontal electrodes 28, 91 are disposed in the tank and suspended by the nonconductive cover 90. The central electrode 91 is electrically connected with the neutral conductor 89 of an alternating-current network while the symmetrically disposed power electrodes 28 are electrically connected with the power line 88 in parallel. In this case, there has been found to be little fouling of the electrodes in practice, in spite of the usual tendency of scum formation at the top of a treatment tank or trough, because of the accelerated movement of the micro-organisms effecting decay. In a modification of this system (FIGS. 10 and 11) the horizontal electrodes 87 are connected in parallel to one side of the alternating-current line while the other side of the line is connected to the two vertical electrodes 86 forming electrode pairs with the juxtaposed horizontal electrodes 87.

From FIG. 12, it is evident that the electrodes need not always be parallel to one another and, in fact, can be mutually inclined or inclined toward a wall of the tank. Under all circumstances, however, it is necessary that the power electrodes be so spaced from the neutral electrode that their distance of closest approach is less than the distance of closest approach of the power electrode to a wall of the housing. As much as possible, this closest distance between power and indifferent electrode should be the same for all phases to eliminate phase shifting and electrolytic decomposition as a result of such shifting.

To permit a large tank to operate with few electrodes or with electrodes having a relatively small surface area, the electrodes 40 (FIGS. 13 and 14) can be mounted on spans 41 above the tank 42. The electrodes are carried by a movable carriage 70 whose wheels 71 engage complementary rails on the spans 40. A pair of tubes 69 depend from the carriage and serve as insulators and guides for the electrodes 40 which are mounted in bearings 67 of openwork supports 68. The pylons 59 carry the wires 77 and 78 of the alternating-current network which are connected to the electrodes by trolley contactors 72, 74. The lead 73 supplying the trolleys and connected with the network 77, 78 is in series with a voltage-dropping resistor 66 so selected that the current density of the electrical stimulus is within the desired range. The spans 40 are provided with outriggers 75 shiftable along the ledges 43 of the tank between stops 80 (e.g. limit switches) which maintain the closest distance between the electrodes 40 and a wall of the tank at a magnitude greater than the distance between the electrodes. Only one of the electrodes 40, i.e. the power electrode, need be insulated from the carriage 70 and the spans 40 while the other can be electrically connected thereto. The electrodes 40, however, terminate above the floor of the tank by a distance in excess of their mutual spacing.

In the system of FIG. 6, I show the neutral electrode 29 disposed between two power electrodes 30 and 31 connected to respective phases of a multiphase line. In this case, the distances 32 and 33 between the power electrodes and the common neutral electrode is equal so that no phase shift occurs. It is conceivable however, that the construction of the tank will require one of the distances 32 and 33 to be different from the other, in which case a compensating phase shift may be made in the applied current to prevent electrolysis. In the arrangement of FIG. 7, the power electrodes 35, 36 and 37 are connected respectively with the power lines of a three-phase source and are spaced apart by distances 39 in excess of the distance 38 of each power electrode from the central neutral electrode 34. The latter is grounded so that no electrolysis can occur.

In the system of FIG. 15, the electrodes 119 and 120 are hollow and agitation of the sludge is effected by passing air through these electrodes via pipes 121 and valves 122. The air outlets from the electrodes 119 and 120 should be as far below the level of the sludge as possible to insure a long contact time between the rising bubbles of oxygen and air and the sludge. In the event that air agitation is not desirable, other gases may be used. Since anaerobic biological decay of the sewage or putrefaction produces considerable quantities of methane, this gas can be connected (FIG. 20) via a hood 124 with part of the methane recycled by pump 123 to the tubular electrodes 120. The remainder of the methane can be led off via conduit 124′. A timing valve 125 responsive to the rate of methane evolution can control the pump 123.

Figure 16:
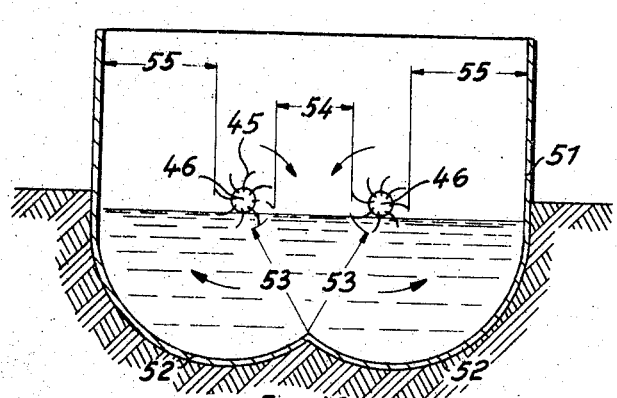
FIG. 16 is a vertical cross-sectional view of an apparatus in which the electrodes constitute an agitating means.
Figure 17:
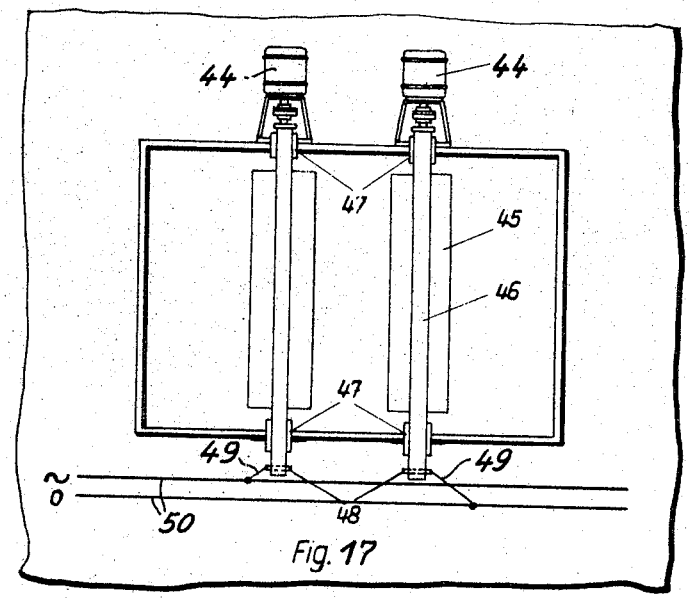
FIG. 17 is a plan view of the apparatus of FIG. 16.

As illustrated in FIGS. 16 and 17, electrodes 46 connected to an A-C network 50 via leads 49 and contact brushes 48, can be rotatably journaled in bearings 47 on opposite lateral walls of the tank. The bottom or floor of the tank 51 has the configuration of cylindrical shells 52 whose centers are at the axis of rotation of the electrodes 46. The latter are provided with agitating blades 45 curved in the direction of rotation of the electrodes. The distance 54 of closest approach of the electrodes is smaller than the distance 53, 55 between the blades and the walls of the tank 51. The electrodes can also be provided with flat paddle-wheel blades 57 as illustrated for the electrodes 58 in FIG. 18.

Figure 19:
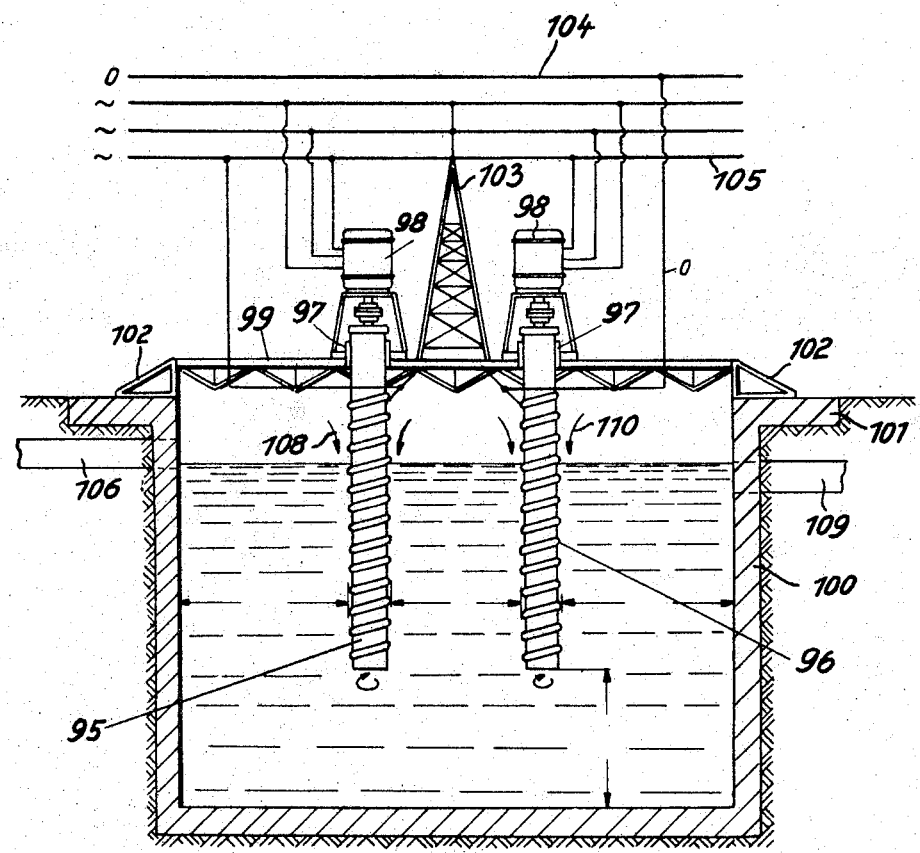
FIG. 19 is a vertical cross-sectional view of another embodiment wherein the electrodes constitute agitating means.

In FIG. 19, I show electrodes 95 and 96 having helical ribs 108 for agitating the sludge within the tank 100. The electrodes are suspended by bearings 97 from a span 99 whose outriggers permit displacement of the span along one horizontal dimension of the tank. The electrodes are each connected with a respective motor 98 in circuit with a three-phase network 105 for rotation about respective vertical axes. One of the electrodes is connected with the neutral conductor 104 of the A-C network while the other is connected with a power phase. The outriggers 102 are supported on the ledges 101 along opposite sides of the concrete tank. The raw sewage is supplied to the tank by a pipe 106 while effluent is removed by a conduit 109. The electrodes 95 and 96 establish a mechanical movement of the sewage downward in the direction of arrows 108, 110, thereby insuring that contact between the sewage and air takes place. This permits aerobic processes to occur without difficulty. Anaerobic putrefacation of the sewage also requires a high degree of mixing to insure homogeneity of the mass. The helical rib need not have any considerable height since encrustation by electrolysis does not occur.

Under the operating conditions mentioned earlier, biological decomposition of the sewage takes place in a highly effective manner. It is, however, also possible to use the apparatus described above to sterilize the sewage, in which case the current density is raised to a killing level or to freeze or paralize the microorganisms by the use of lesser current density. In the system of FIG. 3, moreover, a cylindrical electrode can be employed instead of a plurality of angularly spaced electrodes, a cylindrical shield being also suitable in this case. The treatment process has been found to inhibit colloidal agglomerates.

Referring again briefly to the system of FIG. 21, it is also possible to use the tank 223 serving as a sterilizing tank for decontaminating sewage sludge at high current density while making use of electrical stimulation in tank 213. It is also possible to treat excess sewage above that which can be normally handled by a sewage treament plant, with sterilization in the event this becomes necessary.

I claim:

1. A method of treating sewage wherein biologically decomposable organic matter contained therein is decomposed by living decomposition-promoting micro-organisms present in said sewage, the improvement which comprises the steps of introducing said sewage into a settling tank; immersing a pair of electrodes in said tank with a mutual spacing less than that between said electrodes and the closest wall of said tank; passing an alternating current between said electrodes and through at least a portion of the sewage contained in said tank at a current density between substantially 1 and 100 ma./cm.$^2$, said current density being sufficient to activate said microorganisms but less than that at which said organisms are inactivated by alternating-current fields, in the absence of any direct-current component tending to electrolyze sewage at said electrodes; and mechanically mixing said portion of said sewage with the remainder of said sewage in said tank.

2. The improvement defined in claim 1 wherein said alternating current has a frequency between 40 and 500 cycles/sec. and said current density is about 10 ma./cm.$^2$.

3. The improvement defined in claim 1 wherein said portion of said sewage is mechanically admixed with said remainder thereof by displacing at least one of said electrodes in said tank.

4. The improvement defined in claim 1 wherein said portion of said sewage is mechanically mixed with the remainder of the sewage in said tank by passing a gas through the sewage therein.

5. The improvement defined in claim 4, further comprising the steps of collecting gas evolved by the decomposition of said organic matter and employing it to agitate the sewage in said tank.

6. An apparatus for treating sewage wherein biologically decomposable organic matter is subjected to the action of decomposition-promoting micro-organisms mixed with said sewage, said apparatus comprising a treatment tank having at least limitedly electrically conductive walls at substantially ground potential adapted to receive said sewage; at least two spaced-apart electrodes immersed in the sewage within said tank, at least one of said electrodes having clearance from all of the walls of said tank; and a source of alternating current connected across said electrodes with a power line connected to said one of said electrodes, said electrodes being so disposed and arranged within said tank that their mutual spacing at their distance of closest approach through said sewage defines an electrical path whose electrical resistance is less than the least-resistance electrical path between said one of said electrodes and the walls of said tank whereby the current flow between said tank and said one of said electrodes is substantially less than that between said electrodes.

7. An apparatus as defined in claim 6 wherein said source has a polyphase alternating-current output and is provided with a respective conductor for each phase, said electrodes including a central grounded electrode and a plurality of power electrodes, each electrically connected with one of said conductors and equispaced about said grounded electrode.

8. An apparatus as defined in claim 6, further comprising electrically insulating shield means interposed between each of said electrodes and the walls of said tank while partially surrounding said electrodes.

9. An apparatus as defined in claim 6, further comprising mixing means including a first one of said electrodes for mechanically agitating said sewage.

10. An apparatus as defined in claim 9 wherein said one of said electrodes is hollow and provided with an opening below the level of said sewage, said mixing means further comprising a source of a gas and means connected between said source and said first electrode for forcing said gas therethrough.

11. An apparatus as defined in claim 10 wherein said source of gas includes a hood overlying said tank for collecting gas released from said sewage.

12. An apparatus as defined in claim 9 wherein said mixing means include drive means for displacing said first electrode within said tank.

13. An apparatus as defined in claim 12 wherein said drive means include a motor for rotating said first electrode, said mixing means further comprising a projecting formation on the periphery of said first electrode for mechanically entraining said sewage.

14. An apparatus as defined in claim 13 wherein said first electrode is rotatable about a vertical axis and said formation is a helical rib on the periphery of said first electrode.

References Cited

UNITED STATES PATENTS

| | | | |
|---|---|---|---|
| 1,162,213 | 11/1915 | Bloom | 99—221 X |
| 1,392,213 | 9/1921 | Peck | 210—11 |
| 1,431,580 | 10/1922 | Graetzer et al. | 219—284 |
| 1,525,297 | 2/1925 | Hartley et al. | 210—542 |
| 1,738,801 | 12/1929 | Shemitz et al. | 204—180 X |
| 1,751,459 | 3/1930 | Simmer | 210—11 |
| 2,081,039 | 5/1937 | Kessener | 210—542 |

OTHER REFERENCES

Porter, Bacterial Chemistry and Physiology, 1946, John Wiley & Sons, New York, pp. 196–198 relied on.

MORRIS O. WOLK, *Primary Examiner.*

M. E. ROGERS, *Assistant Examiner.*